No. 790,418. PATENTED MAY 23, 1905.
G. APFEL.
GAS GENERATOR.
APPLICATION FILED APR. 4, 1904.
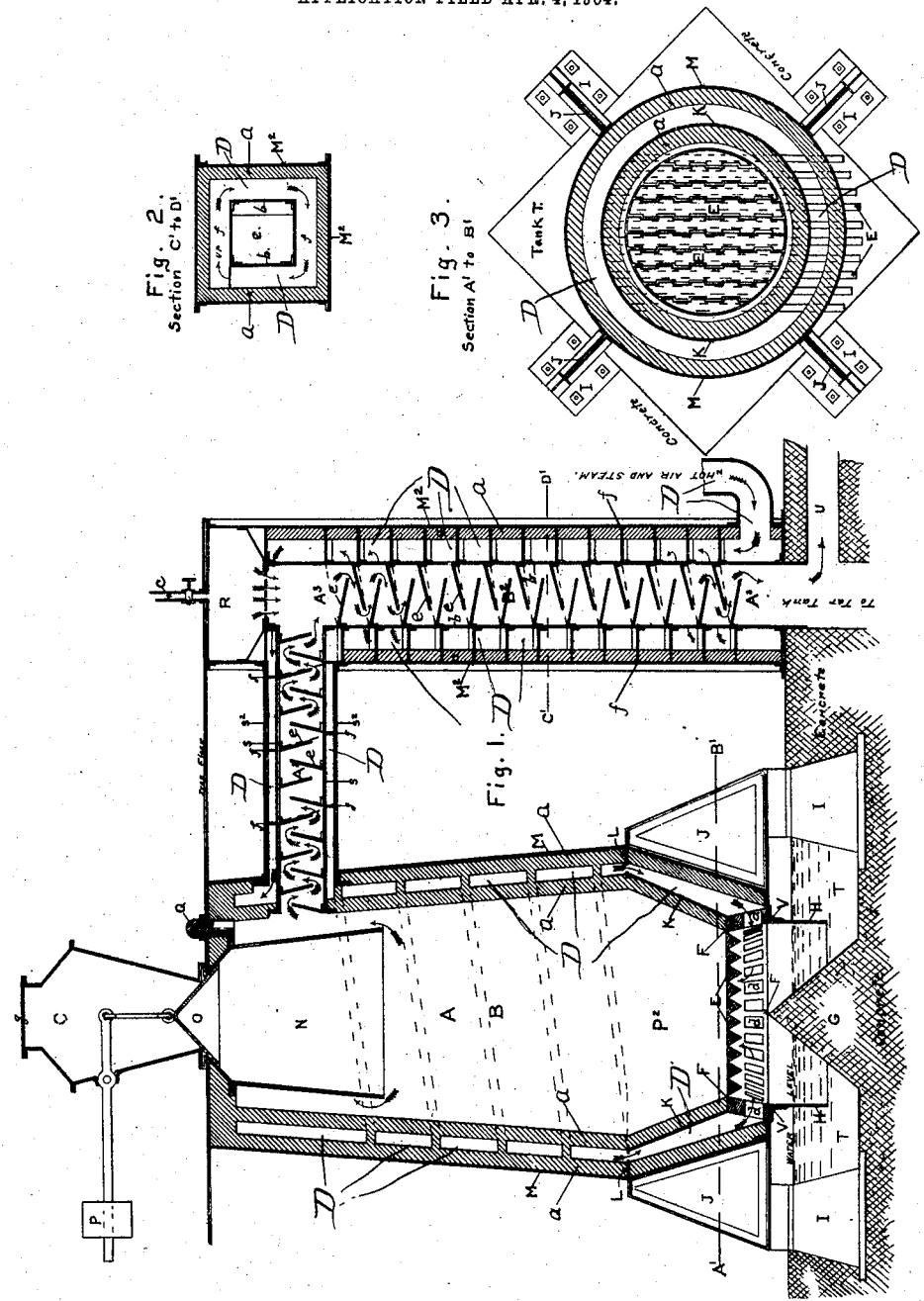

No. 790,418.  
Patented May 23, 1905.

UNITED STATES PATENT OFFICE.

GEORGE APFEL, OF CHICAGO, ILLINOIS.

GAS-GENERATOR.

SPECIFICATION forming part of Letters Patent No. 790,418, dated May 23, 1905.

Application filed April 4, 1904. Serial No. 201,417.

*To all whom it may concern:*

Be it known that I, GEORGE APFEL, a citizen of the United States, residing at Chicago, county of Cook, State of Illinois, have invented a useful Improvement in Gas-Generators; and I do hereby declare the following is a full and exact description of my invention, so that any one skilled in the art can easily construct the same by reference to the accompanying drawings.

I do not claim as new or as my invention a gas-generator having a combustion-chamber surrounded by hollow walls or spiral chambers for heating the steam and air that enter the bed of incandescent coal, nor do I claim as new or as my invention the heating of the steam and air.

In all prior inventions for the manufacture of producer-gas the temperature of the steam and air has been an unknown quantity and the gas produced has always had an excess of carbon dioxid and nitrogen, making a poor quality of gas. By my apparatus I heat the steam and air to such a degree of temperature (not less than $1,800°$ Fahrenheit) that when I introduce them into the bed of incandescent coal they produce a gas having little or no carbon dioxid. The gases are also in a nascent condition ready to combine with any other element that may be introduced into the chamber by my chemical-tank and by which I control the heat of the ingoing and outgoing gases. I do also away with scrubbing-towers, mechanical washers, regenerators, and purifiers.

By reference to the drawings, Figure 1 shows a vertical section of my generator having one elongated chamber (marked A, $A^2$, and $A^3$) bent into the shape of the inverted letter U, the two legs or columns marked, respectively, B and $B^2$. The chamber (marked A $A^2$ $A^3$) is surrounded by the continuous helical and spiral chamber, (marked D D,) having a heating-surface ten times longer than chamber A. Fig. 3 shows a horizontal section of column B at line A' to B', and Fig. 2 shows a horizontal section of column $B^2$ at line C' to D'.

The decomposing or combustion end of chamber marked A in column B is surmounted by the air-tight feeder or coal-tank, (marked C,) while the mixing or combining end in column $B^2$ is surmounted by the perforated chemical-tank, (marked R.) In the top of that part of the chamber marked A is an iron hood, (marked N,) which keeps the coal as it drops down from the feeder from touching the inner walls of the chamber A. The opening at top of hood N is closed by the bell O, which is held in place by the lever and weight P. Resting on top of the hood is the aforementioned tank marked C, closed by cover $g$. In the top of the chamber A are also one or more safety-valves closed by loose-fitting plugs, (marked Q.) The base of the outer shell M M rests upon and is fastened to an L-shaped ring, (marked V V.) The perforated cast-iron base (marked F F) rests upon this ring, and the hood underneath (marked H H) is also attached thereto. Fastened to this ring V and to the outer shell M are the four struts marked J J J J, which rest upon four cast-iron bases I I I I, that are sunk into and rest upon a concrete foundation. The floor inside of the quadrangle of the four bases is sunk to a level with the bottom of those bases and is filled with water, thus forming a water-tank, (marked T T.) In the center of the tank is a concrete cone, (marked G.) The apex of this cone almost touches the grate-bars, (marked E E.) A perforated cast-iron ring or circular base (marked F) supporting the rocking grate-bars (marked E) and having openings (marked $d$ $d$) rests upon this ring V. The iron shell of the hearth or fire-pot (marked K K) lined with fire-brick (marked $a$ $a$) rests upon this perforated cast-iron ring F. The rocking grate-bars (marked E) also rest on the base F and extend through the outer shell M, as shown. A perforated iron disk (marked L L) rests upon and braces the fire-pot K K and braces the outer shell M M and also supports and braces the walls of the helical and spiral chamber D D D D.

That part of the chamber A marked $A^2$ and $A^3$ is lined with a thin tiling of high refractive material. (Not shown.) The shelves $e$ $e$ are also of the same material. The inner iron shell (marked S S) incloses that part of the chamber A marked $A^2$ and is covered by a larger shell (marked $S^2 S^2$) having the spiral chamber D D between and which makes continuous the chamber A and $A^3$ and the spiral chamber D. Vertical partitions or shelves (marked e e) deflect the gas from side to side of that part of the chamber marked $A^2$ and heating the spiral chamber D. The spiral chamber D, surrounding the chamber A at $A^2$, is made by an iron flange fastened to the shell S S and snugly fitting into the outer shell $S^2$, as shown.

That part of the chamber A marked $A^3$ in column $B^2$ is inclosed by the tile-lined iron shell, (marked b b,) which is extended below the concrete floor and communicating with the tar-tank underneath, but not shown on the drawings. The spiral flanges f f form, with the brick lining (marked a a) and the inner shell b b, a continuous spiral chamber, (marked D.) At the top of the column $B^2$ is the tank marked R, having a perforated bottom. This tank can be filled either by gravity from a tank or a pump through the pipe marked c. This tank is over the mixing or combining end (marked $A^3$) of chamber A, and when filled with a hot liquid chemical, like sodium or potassium carbonate, the weight of the falling liquor and the condensing gases as they descend to the bottom of column $B^2$ produce a vacuum in the top of the combustion end of chamber A, thereby producing a draft through the bed of incandescent coal, having the same effect as a suction-fan. Furthermore, the hot gases coming over from the combustion end of chamber A are in a nascent condition (having a temperature of over 1,800° Fahrenheit) and meeting the cooler streams of the hot carbonate rapidly combine and condense. The placing of the tank R over the combining end permits the hot liquid (as it enters the tank) to be heated to a still higher temperature from the waste heat of the hot gases. The hot liquor is vaporized as it issues through the perforations and combines with the hot gases at once. By the time the gases have reached the bottom of column $B^2$ they are cooled enough for the tar and nitrate to separate out and drop into the receiving-tank underneath. The resulting by-products materially reduce the cost of the gas while leaving the gas of greater calorific value. The outer shell (marked $M^2 M^2$) of column $B^2$ rests upon and is fastened to the concrete floor.

In that part of chamber A marked $A^3$ at regular intervals are the sloping shelves, (marked e e e e,) which deflect the downward course of the cooling gases and liquor against the sides of the tile-lined end of chamber A marked $A^3$, thereby heating the spiral chamber D. Beneath the column $B^2$ is an opening leading straight down to the tar and liquor tank, while the gases are led through the duct marked U.

The helical chamber D D in column B is made by a spiral course of brick binding the two walls (marked a a) together and running up from the perforated disk L to the shells S and $S^2$.

In operating my generator the hot gases and the bed of incandescent coal heat the walls of the helical chamber D D, so that the hot air and steam when entering through the openings d d in base F have been heated to a temperature of 1,600° Fahrenheit, bringing up the temperature of the bed of incandescent coal to nearly 2,300° Fahrenheit. As these hot gases pass upward and over they are deflected from side to side by the vertical shelves and become somewhat cooler, but in a nascent condition, and meeting the cooler vapor from the tank R are suddenly condensed and carried down with the liquor, the weight of the liquor and the condensation of the gases producing a vacuum over the bed of incandescent coal, while the waste heat heats the walls of the spiral chamber D D and the contents of tank R. The effect of bending the combining end of the chamber A downward has a triple purpose and which I particularly claim as my invention—first, the hot steam and air entering at the base and becoming hotter as it ascends in the spiral chamber D meets and takes up all the waste heat of the descending gases, thus saving fuel; second, the hot chemicals from the perforated tank R meet and combine with the hot gases while both are flowing downward and cooling together, thereby combining better; third, the falling liquor and condensed gases by their combined weight have the same effect as a vacuum-pump, thus saving the power necessary for a pump.

What I claim as my invention is as follows:

1. The combination of a generating-chamber having a coal-charging tank overhead, a water-tank underneath and a cone in the center of the tank extending up and into said generator, with a continuous horizontal and vertical exhaust-pipe, having deflecting-shelves in the manner set forth.

2. The combination of a generating-chamber having a coal-charging tank overhead, a water-tank underneath, a cone in the center of said tank extending up and into said generator, a continuous horizontal and vertical exhaust-pipe having deflecting-shelves, with a continuous helical and spiral heating-chamber surrounding said generator and exhaust-pipe in the manner as shown.

3. The combination of a generating-chamber having a coal-charging tank overhead, a water-tank underneath, a cone in the center of said tank extending up and into said generator, a horizontal and vertical exhaust-pipe having deflecting-shelves, a continuous helical and spiral heating-chamber surrounding said generator and exhaust-pipe, with a heating liquor-tank surmounting the vertical end of the exhaust-pipe and a liquor-tank underneath the same in the manner set forth.

In testimony whereof I have signed my name to this specification in the presence of two subscribing witnesses.

GEORGE APFEL.

Witnesses:
 DOUGLAS J. HOGAN,
 HENRY SCHEFFEL.